US012604050B1

(12) United States Patent
Chud et al.

(10) Patent No.: US 12,604,050 B1
(45) Date of Patent: Apr. 14, 2026

(54) COMPUTER-IMPLEMENTED METHODS FOR IMPLEMENTING A PRIVACY COMPLIANCE WATERMARK THAT INDICATES ONE OR MORE ACTIONS TAKEN IN THE GENERATION OF MODIFIED MEDIA CONTENT ACCORDING TO ONE OR MORE PRIVACY SETTINGS FOR A CLIENT DEVICE

(71) Applicant: Amazon Technologies, Inc., Seattle, WA (US)

(72) Inventors: Andrew Christopher Chud, Austin, TX (US); Katherine Goodrich, New Haven, CT (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/466,241

(22) Filed: Sep. 13, 2023

(51) Int. Cl.
| | |
|---|---|
| *H04N 21/234* | (2011.01) |
| *H04N 21/233* | (2011.01) |
| *H04N 21/2389* | (2011.01) |
| *H04N 21/262* | (2011.01) |
| *H04N 21/45* | (2011.01) |
| *H04N 21/4627* | (2011.01) |

(52) U.S. Cl.
CPC ..... *H04N 21/23892* (2013.01); *H04N 21/233* (2013.01); *H04N 21/23424* (2013.01); *H04N 21/4508* (2013.01)

(58) Field of Classification Search
None
See application file for complete search history.

(56) References Cited

U.S. PATENT DOCUMENTS

| | | | | |
|---|---|---|---|---|
| 2007/0276926 A1* | 11/2007 | LaJoie | ................... | G06F 21/10 |
| | | | | 709/219 |
| 2012/0240144 A1* | 9/2012 | Rose | .................. | H04N 21/2668 |
| | | | | 725/35 |
| 2017/0180822 A1* | 6/2017 | Pradel | .................. | H04N 21/438 |

* cited by examiner

*Primary Examiner* — Brian T Pendleton
*Assistant Examiner* — Jean D Saint Cyr
(74) *Attorney, Agent, or Firm* — NICHOLSON DE VOS WEBSTER & ELLIOTT LLP

(57) ABSTRACT

Techniques for utilizing a privacy compliance watermark in modified media (e.g., video) that indicates one or more actions taken in the generation of the modified media (e.g., video) content according to one or more privacy settings for a user are described. According to some examples, a computer-implemented method includes receiving a request, by a provider network from a client device, including one or more privacy settings for the client device; inserting, by the provider network, secondary content according to the one or more privacy settings for the client device into primary content to generate modified content; generating, by the provider network, a privacy compliance watermark that indicates one or more actions taken by the provider network according to the one or more privacy settings for the client device; transmitting the privacy compliance watermark from the provider network to the client device or to a service; and sending the modified content from the provider network to the client device.

20 Claims, 12 Drawing Sheets

700

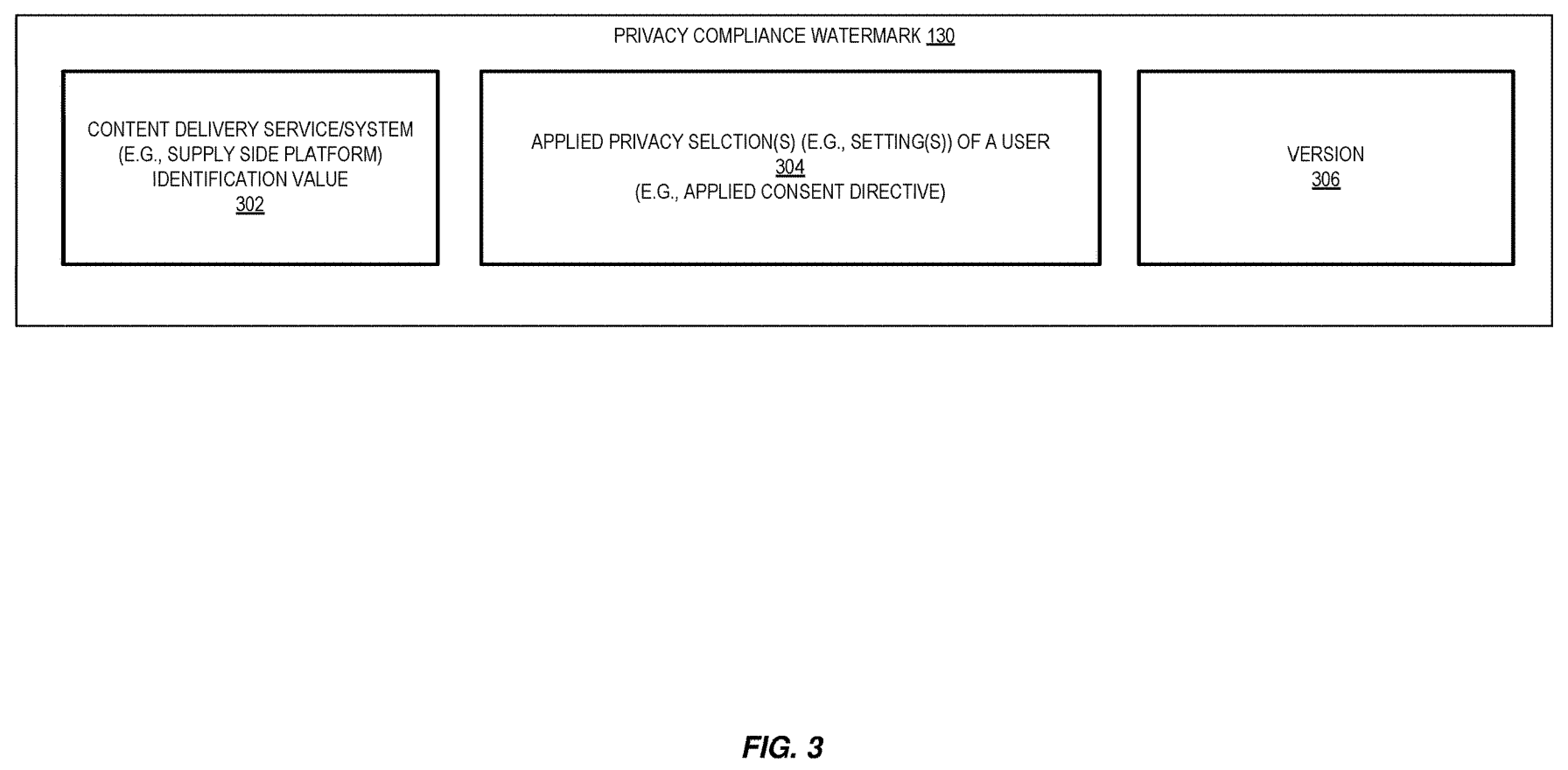

PRIVACY COMPLIANCE WATERMARK 130

CONTENT DELIVERY SERVICE/SYSTEM
(E.G., SUPPLY SIDE PLATFORM)
IDENTIFICATION VALUE
302

APPLIED PRIVACY SELCTION(S) (E.G., SETTING(S)) OF A USER
304
(E.G., APPLIED CONSENT DIRECTIVE)

VERSION
306

FIG. 3

IMAGE (E.G., JPEG / JFIF) SEGMENTS
500

START OF IMAGE
502

START OF FRAME (BASELINE OR PROGRESSIVE DCT)
504

DEFINE HUFFMAN TABLE(S)
506

DEFINE QUANTIZATION TABLE(S)
508

APPLICATION-SPECIFIC (APPn)
(E.G., EXIF JPEG FILE INCLUDING AN APP1 MARKER TO STORE METADATA)
510

PRIVACY COMPLIANCE WATERMARK 130A

COMMENT (COM)
512

PRIVACY COMPLIANCE WATERMARK 130B

END OF IMAGE
514

700

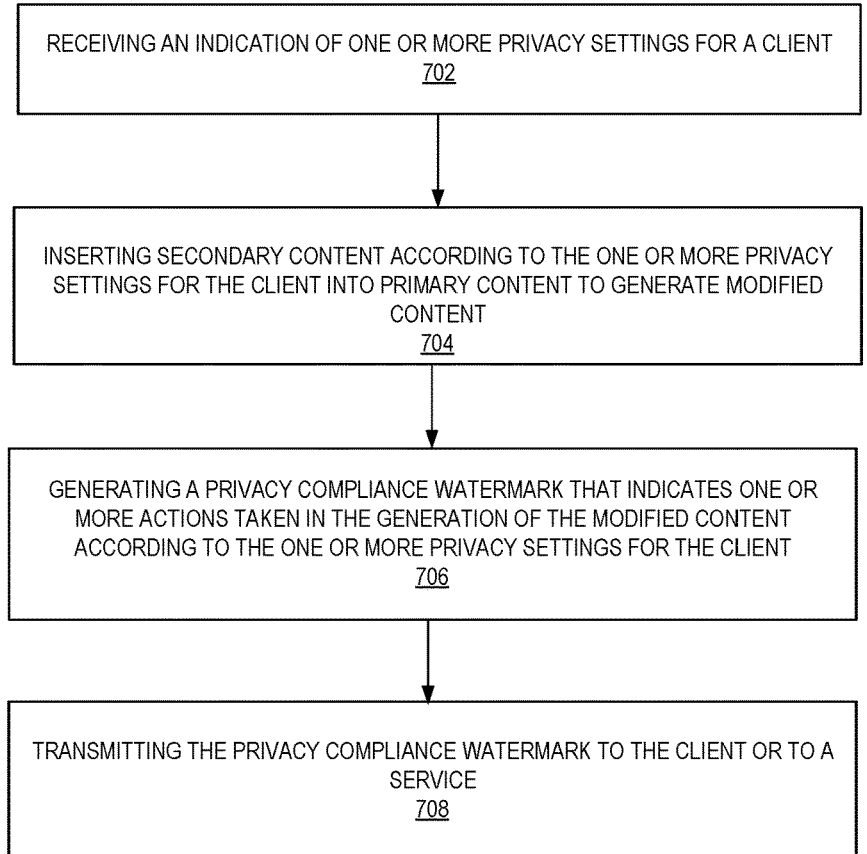

RECEIVING AN INDICATION OF ONE OR MORE PRIVACY SETTINGS FOR A CLIENT
702

INSERTING SECONDARY CONTENT ACCORDING TO THE ONE OR MORE PRIVACY SETTINGS FOR THE CLIENT INTO PRIMARY CONTENT TO GENERATE MODIFIED CONTENT
704

GENERATING A PRIVACY COMPLIANCE WATERMARK THAT INDICATES ONE OR MORE ACTIONS TAKEN IN THE GENERATION OF THE MODIFIED CONTENT ACCORDING TO THE ONE OR MORE PRIVACY SETTINGS FOR THE CLIENT
706

TRANSMITTING THE PRIVACY COMPLIANCE WATERMARK TO THE CLIENT OR TO A SERVICE
708

*FIG. 7*

COMPUTER-IMPLEMENTED METHODS FOR IMPLEMENTING A PRIVACY COMPLIANCE WATERMARK THAT INDICATES ONE OR MORE ACTIONS TAKEN IN THE GENERATION OF MODIFIED MEDIA CONTENT ACCORDING TO ONE OR MORE PRIVACY SETTINGS FOR A CLIENT DEVICE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

FIG. 3 is a diagram illustrating an example format of a privacy compliance watermark according to some examples.

FIG. 7 is a flow diagram illustrating operations of a method of generating a privacy compliance watermark that indicates one or more actions taken in the generation of modified content according to one or more privacy settings for a client according to some examples.

DETAILED DESCRIPTION

Figure 1:
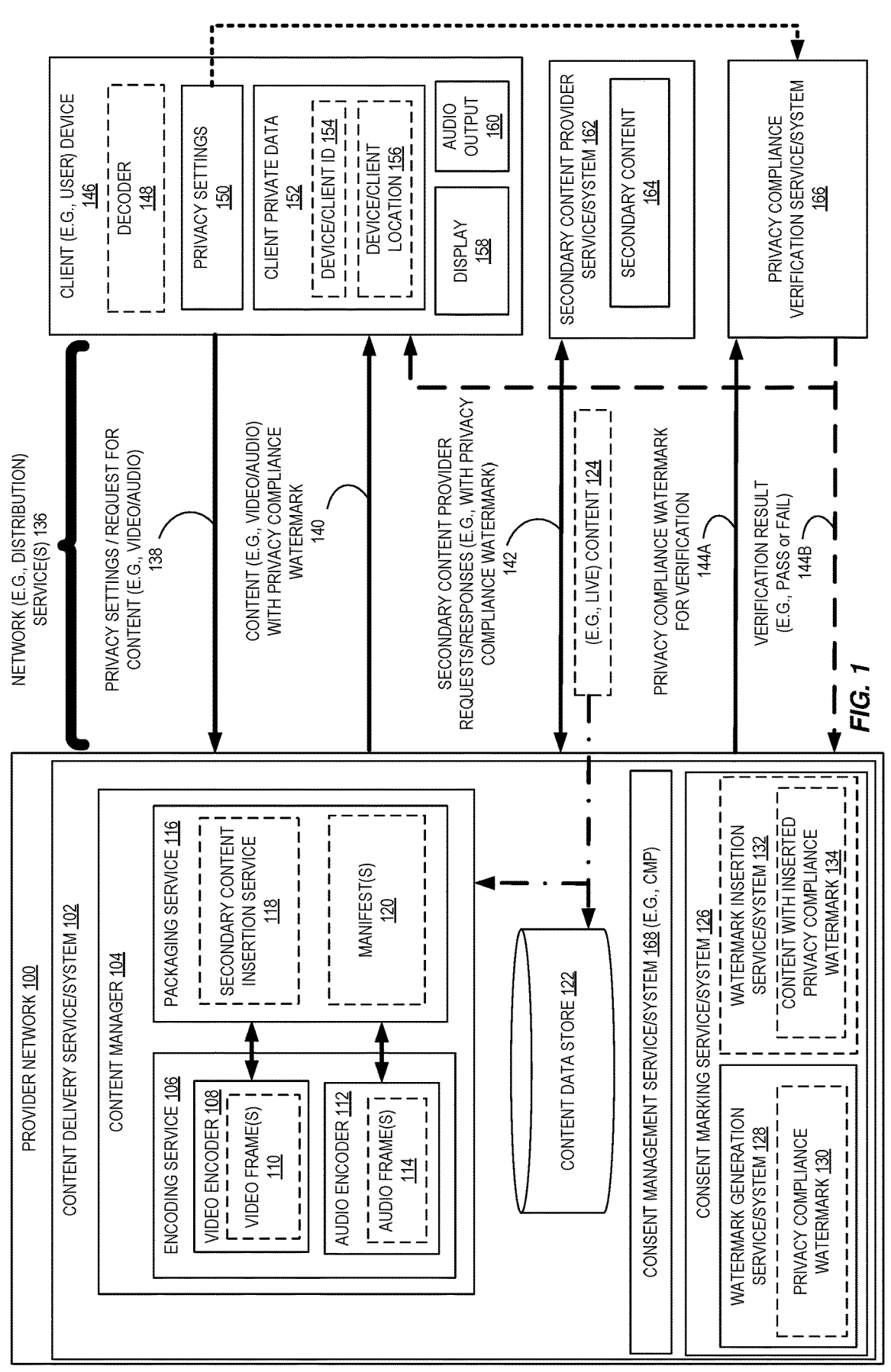
FIG. 1 is a diagram illustrating an environment including a provider network, coupled to a client device, having a consent marking service/system that utilizes a privacy compliance watermark according to some examples.

The present disclosure relates to methods, apparatus, systems, and non-transitory computer-readable storage media for implementing a privacy compliance watermark that indicates one or more actions taken in the generation of modified media content according to one or more privacy settings for a client. Entities (e.g., companies) are under increasing pressure to comply with privacy, data protection, and/or anti-competition laws (e.g., written statutes passed by a legislature) and regulations (e.g., standards and rules adopted by administrative agencies that govern how one or more laws will be enforced and/or standards and rules adopted by self-regulatory industry bodies (e.g., which are not associated with agencies appointed by legislatures)), e.g., that apply to users/devices in a location (e.g., jurisdiction). In certain examples, the punishment for violating privacy laws and/or regulations or violating anti-competition laws and/or regulations include (e.g., large) fines. Demonstrating (e.g., proving) compliance is a challenge. An auditor may have to examine a change history (e.g., version history) for relevant software packages and/or systems (e.g., which may not be available), and even then, proving a negative (for example, proving that secondary content selection (e.g., a secondary content selection algorithm) did not use information disallowed by the user's opt-out choices) may be impossible.

To solve these problems, examples herein are directed to the implementation of a privacy (e.g., regulation) compliance watermark, e.g., implemented by a computer and not a human. In certain examples, the privacy (e.g., regulation) compliance watermark makes it easier to demonstrate privacy opt-out mechanisms are working, e.g., using an externally-visible (e.g., visible to a client/user and/or to a third-party) privacy (e.g., regulation) compliance watermark. In certain examples, the privacy (e.g., regulation) compliance watermark (e.g., the information in the watermark) is only visible (e.g., to a human) when using some tooling, for example, using a browser plugin that displays icon images over media assets that contain or were served to the client with such a watermark. In certain examples without using such tooling, a watermark may interfere with the viewer experience, e.g., viewing a video. In certain examples, the privacy (e.g., regulation) compliance watermark is proof of how an entity that provided the corresponding (e.g., media) content complied with any privacy, data protection, and/or anti-competition laws and/or regulations. In certain examples, the privacy (e.g., opt-out) compliance watermark is proof of how an entity that provided the corresponding (e.g., media) content complied with any opt-out request of the client, e.g., complied with a corresponding selection by a client to opt-out of consent of use of certain (e.g., private) information of that client. In certain examples, the privacy (e.g., regulation) compliance watermark is proof of how an entity that provided the corresponding (e.g., media) content complied with one or more consumer privacy rights and/or business obligations regarding the collection and/or sale of personal information.

In certain examples, personal information is first and/or last name, a home or other physical address including street name and name of a city or town, online contact information, a screen or client (e.g., user) name that functions as online contact information, a telephone number, a social security number, client device Internet Protocol (IP) address, information about the client's device and/or connection (e.g., browser type, language and settings, device operating system (OS), device make and model, etc.), a persistent identifier that can be used to recognize a user over time and across different websites or online services, a photograph, video, or audio file, where such file contains a client's (e.g., user's) image or voice, geolocation information sufficient to identify street name and name of a city or town, or information concerning the client (e.g., user) that the operator collects online and combines with an identifier described above, or any combination thereof.

In certain examples, an opt-out indicates a restriction of processing, withdrawal of previously given consent, deletion of personal information, prevention of the sale or sharing of personal information, or any other action that indicates the entity (e.g., business) with access to the personal information is to stop utilizing the personal information they have collected or processed previously.

In certain examples, when it is desirable to insert secondary content into primary content (such as, but not limited to, inserting an advertisement into media content, e.g., the secondary content added as a file in a series of files played by the player), a secondary content insertion service/system reads the client (e.g., customer) privacy settings (e.g. opt-out and/or opt-in choices) from the request (which may have been provided by an external consent management platform (CMP) or from an on-site CMP), and applies those settings to take action in the generation of the modified (e.g., media) content according to one or more privacy settings (e.g., opt-out and/or opt-in choices) for a client. In certain examples, the actions include zeroing out all persistent identifiers (e.g., all or a portion of an Internet Protocol (IP) address) and/or removing or modifying parameters used to select and deliver secondary content. Certain examples herein mark the modified content (e.g., advertisement creatives) with a watermark that provides the client (e.g., end user) (e.g., through the use of a tool or other software) the ability to quickly and easily understand the one or more actions taken in the generation of modified (e.g., media) content according to the one or more privacy settings for the client (e.g., which type of privacy logic was applied).

In certain examples, the secondary content is an image (e.g., according to a Joint Photographic Experts Group (JPEG) standard) and the privacy (e.g., regulation) compliance watermark is included as metadata of the image file, e.g., the privacy (e.g., regulation) compliance watermark is included within a comment (COM) metadata item.

In certain examples, the secondary content is a media file (e.g., image, video, and/or audio) that is provided to the client, e.g., via a web page or a (e.g., mobile) application. In certain examples, the media file is referred to as a HyperText Markup Language (HTML) creative. In certain examples, the privacy (e.g., regulation) compliance watermark is included as metadata of the media (e.g., HTML creative) file, e.g., as a metadata (<META>) tag. In certain examples, the media file is a "display" media file, e.g., an image for secondary content (e.g., advertisement) that a client can click to go to the secondary content's (e.g., advertiser's)

website. In certain examples, the media file is a "rich media" file, e.g., a media file with interactive elements (e.g., animations, image galleries, games, or embedded videos).

In certain examples, the secondary content is a video (e.g., according to a video advertisement serving template (VAST) standard) and the privacy (e.g., regulation) compliance watermark is included as metadata of the video file, e.g., the privacy (e.g., regulation) compliance watermark is embedded in data in a video frame. In certain examples, a content provider (e.g., media publisher) calls a secondary content provider service/system (e.g., advertisement server) and receives a response (e.g., a VAST response). In certain examples, the privacy (e.g., regulation) compliance watermark is included in the VAST response. In certain examples, the response is an Extensible Markup Language (XML) file that includes the metadata that a client device (e.g., media player) uses to playback the secondary content (e.g., advertisement) and notify interested parties about a corresponding (e.g., advertisement) transaction. In certain examples, the privacy (e.g., regulation) compliance watermark is included in a manifest file for a video.

In certain examples, the secondary content is audio (e.g., an audio creative) and the privacy (e.g., regulation) compliance watermark is included as (e.g., human inaudible) metadata of the audio file. In certain examples, a human inaudible privacy (e.g., regulation) compliance watermark audio is detectable by other listening devices. In certain examples, audio that identifies the privacy (e.g., regulation) compliance watermark is playable (e.g., on request), e.g., as corresponding human-audible audio.

In certain examples, the privacy compliance watermark includes an indication of one of more (e.g., any single or combination of): (1) behavioral targeting was disabled for the request (e.g., removing the use of previously recorded historical user behavior as criteria for secondary content selection), (2) all client (e.g., user) and/or device identifiers have been removed from the request before it was processed or logged, (3) Children's Online Privacy Protection Rule (COPPA rule) restrictions have been applied (e.g., restrictions against using persistent identifiers in COPPA-flagged traffic to build or deploy a behavioral profile) (e.g., when primary content is flagged as directed to children under 13 years of age, then all client and/or device identifiers are removed from the request before it is processed or logged), (4) the secondary content (e.g., ad) was served to a European Union (EU) client (e.g., user) and/or device where ePrivacy or Digital Services Act (DSA) and Digital Market Act (DMA) regulations apply, (5) the secondary content (e.g., ad) was served to a California user where California Consumer Privacy Act (CCPA) and California Privacy Rights Act (CPRA) regulations apply, or (6) geolocation information was removed or its precision was reduced (e.g., the device location is specified within a radius of a certain distance (e.g., 50 kilometers (km)) instead of the precision provided by a client mobile device, e.g., the precision of a smaller distance (e.g., 5 km)). In certain examples, the privacy compliance watermark is extensible for additional indications.

In certain examples, the regulatory information is recorded in a third-party vendor (e.g., application programming interface (API)) against a unique identifier, and the privacy compliance watermark (e.g., just) contains the vendor ID and identifier, so the information can be looked up, externally.

In certain examples, the privacy compliance watermark is transcoded into alternative creative media asset versions, e.g., at creative ingestion time. In certain examples, the correct version of the asset would be selected at runtime, e.g., based on the applied privacy settings for the client (e.g., which type of privacy logic was applied to the request).

Examples herein improve the functioning of a computer-implemented method (e.g., and a provider content delivery service) by utilizing a privacy compliance watermark that indicates one or more actions taken in the generation of modified media content according to one or more privacy settings for a client. In certain examples, this allows for an entity (e.g., primary and/or secondary content provider) to prove compliance with (i) privacy laws and/or regulations and/or (ii) anti-competition laws and/or regulations.

Turning now to the figures, FIG. 1 is a diagram illustrating an environment including a provider network 100 (e.g., cloud provider), coupled to a client device 146 (e.g., media player device), having a consent marking service/system 126 that utilizes a privacy compliance watermark according to some examples.

Although the consent marking service/system 126 is shown as part of content delivery service/system 102, in certain examples, the consent marking service/system 126 is external from the content delivery service/system 102, e.g., external to the provider network 100.

In certain examples, the provider network 100 (e.g., cloud provider) is coupled to the client device 146 (e.g., media player device) via network (e.g., distribution) service(s) 136. In certain examples, client (e.g., user) device 146 is to play (e.g., display) content from content delivery service/system 102, for example, play one or more feeds (e.g., live streams), for example, on-demand video/audio and/or linear television (TV) (e.g., that can be viewed according to a set schedule, e.g., not on demand), e.g., sent via network (e.g., distribution) services 136. In certain examples, client device 146 is a media player device, e.g., including a decoder 148 to decode video for viewing on display 158 and/or audio for outputting on audio output (e.g., speaker) 160.

In certain examples, client (e.g., media player) device 146 includes client private data 152, for example, a device and/or client identification (ID) value 154, e.g., to uniquely identify the media player and/or client (e.g., user), and/or a device and/or client location value 156, e.g., to indicate the geographical area of the device 146 and/or user. In certain examples, the client private data 152 includes: the client's (e.g., user's) first and last name, home or other physical address (e.g., including street name and name of a city or town), online contact information, screen or client (e.g., user) name that functions as online contact information, telephone number, social security number, persistent identifier that can be used to recognize a user over time and across different websites or online services, photograph, video, or audio file, where such file contains a client's (e.g., user's) image or voice, geolocation information (e.g., sufficient to identify street name and name of a city or town), or information concerning the client (e.g., user) that an entity (e.g., the provider network 100) collects online and combines with an identifier described above, or any combination thereof. In certain examples, the IP address of the client device is read by the content delivery service/system 102 from the network connection created by the device 146 with the content delivery service/system 102, e.g., the IP address can be used to identify the device location. In certain examples, the client device may not have visibility into what that IP address is, since the device is, for example, running inside a virtual private network (VPN) or inside a network that uses a Network Address Translation (NAT) gateway to translate its private IP address to a public IP address.

Figure 2:
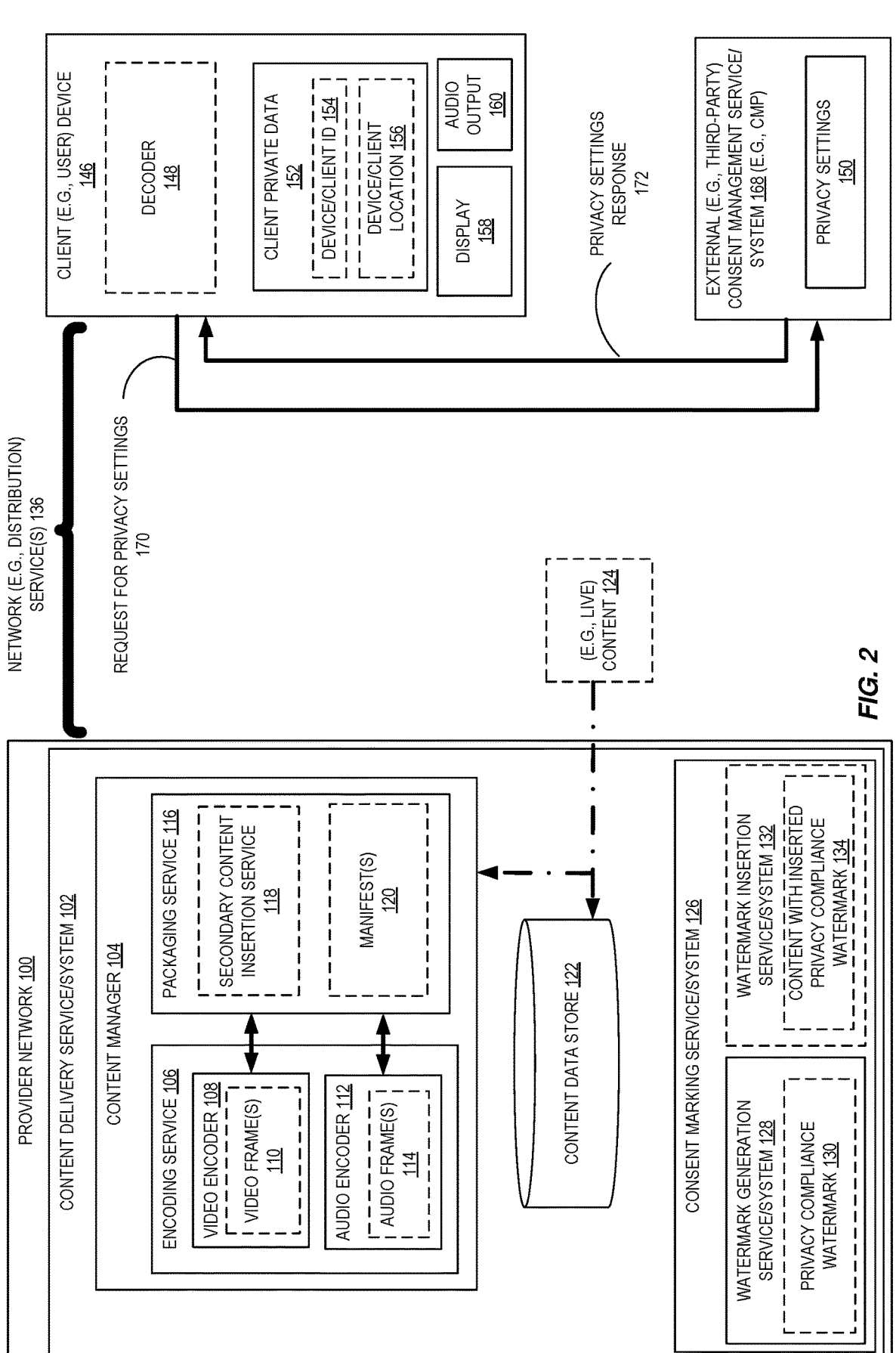
FIG. 2 is a diagram illustrating an environment including a provider network, coupled to a client device, having a consent marking service/system that utilizes a privacy compliance watermark and a third-party consent management service/system according to some examples.

In certain examples, privacy settings 150 stores one or more values that indicate the client's (e.g., user's) privacy selections, e.g., opting in (e.g., allowing) the use of certain private information (e.g., private information discussed in the previous paragraph) or opting out (e.g., denying) the use of certain private information (e.g., private information discussed in the previous paragraph). In certain examples, privacy settings 150 (i) allow a client (e.g., user) to selectively opt-out of allowing the use (e.g., to target (e.g., secondary) content for that user) of certain (e.g., less than all of) the client's private data 152 and/or (ii) allow a client (e.g., user) to selectively opt-in to allowing the use (e.g., to target (e.g., secondary) content for that user) of certain (e.g., less than all of) the client's private data 152. In certain examples, the privacy settings 150 are utilized by one or more other services and systems from the client device 146, for example, the privacy settings 150 may be utilized by provider network 100 (for example, content delivery service/system 102, e.g., secondary content provider service/system 118 thereof) and/or a third-party service/system (e.g., secondary content provider service/system 162). In certain examples, the privacy settings 150 may not be stored in the device, but may instead be stored in a third party CMP (Consent Management Platform) vendor service, e.g., as shown in FIG. 2. In certain examples, when the device 146 makes a request for content 138, it may first invoke the API of the CMP to fetch privacy settings and then pass them along to the content delivery service 102.

In certain examples, a content provider 124 is to send content to a content data store 122 (e.g., which may be implemented in one or more data centers). In certain examples, a content provider 124 is on site to capture video (e.g., and audio) of a live event. In certain examples, content provider 124 is to encode the resulting output and send that encoded content to one or more downstream entities (e.g., content delivery service/system 102), e.g., via one or more networks.

As one example, a media file (e.g., including a video file and audio file) (e.g., a media container) that is to be encoded is accessed from the content data store 122 by content manager 104. In certain examples, the media file may be uploaded to content data store 122 by content provider(s) or provided directly (e.g., as live content) to content manager 104 by content provider(s) (e.g., from a live content encoder).

In certain examples, the content manager 104 controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager, e.g., a graphical user interface (GUI) displayed by a display) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 (e.g., internal to content delivery service/system 102) adds secondary content (e.g., advertisement(s)) into a main content. In certain examples, secondary content provider service/system 162 (e.g., external to provider network 100 and/or external to content delivery service/system 102) adds secondary content 164 (e.g., advertisement(s)) into a main content. In certain examples, secondary content provider service/system 162 (e.g., external to provider network 100 and/or external to content delivery service/system 102) sends secondary content 164 (e.g., advertisement(s)) to secondary content insertion service 118 for insertion.

In certain examples, encoding service 106 is to encode the main content (e.g., and not the secondary content), e.g., and the secondary content provider service/system 162 itself is to send the secondary content to the client device 146 for presentation.

In certain examples, encoding service 106 is to encode both the main content and secondary content (e.g., secondary content 164), e.g., and the secondary content insertion service 118 is to insert the secondary content into the main content. In certain examples, the secondary content is from a secondary content provider, e.g., and the request to publish the secondary content comes from the secondary content provider. In certain examples, secondary content provider requests/responses 142 are sent via network services 136.

In certain embodiments, packaging service 116 includes one or more manifests 120, e.g., identifying the media file(s) (e.g., fragments, streams, etc.). In certain embodiments, a manifest for a particular media file (e.g., a particular title) identifies a proper subset of video and audio representations of the media file for a particular client device 146 (e.g., based on the client's media player (e.g., determined from its client ID value 154), display 158 resolution, audio output 160 capabilities, and/or available bandwidth). In certain embodiments, the content is stored in the content delivery service/system 102 in two parts: (i) the manifest 120 of all available media representations (e.g., their URL addresses and, optionally, other characteristics) and (ii) the media files (e.g., representations) (e.g., stream of fragments) in a single (e.g., container) or multiple files (e.g., in content data store 122). In certain embodiments, a client device 146 is to read a manifest 120 (e.g., sent in response to manifest request) before the client device may make a request for the media from that manifest, and thus access media files (e.g., audio fragments and corresponding video fragments) from content data store 122.

In certain examples, a consent management service/system 168 (e.g., consent management platform (CMP) is included to manage the consent (e.g., opt-in and/or opt-out) for one or more files, e.g., based on a client's (e.g., user's) privacy preferences (e.g., privacy settings 150) and/or based on the geographical location of the client's (e.g., user's) device. For example, those privacy settings in combination with the indication that the device is in California or in Europe may cause a different set of actions to be applied, respectively (e.g., according to location specific regulations). In certain examples, the location of the device is inferred from the client IP address detected (e.g., by the content delivery service/system 102 when the client establishes a network connection). In certain examples, the consent management service/system 168 (e.g., CMP) is included within provider network, e.g., within provider network 100 as shown in FIG. 1. In certain examples, the consent management service/system 168 (e.g., CMP) is external from the provider network (e.g., is a third-party), e.g., is external to the provider network 100 as shown in FIG. 2.

In certain examples, the consent marking service/system 126 includes a privacy compliance watermark generation service/system 128 to generate a privacy compliance watermark 130, e.g., where the privacy compliance watermark 130 includes an indication of one or more actions taken in the generation of content (e.g., modified media content) according to (e.g., an opt-in or opt-out from) the one or more privacy settings 150 for a client (e.g., for a client device 146) and/or based on the geographical location of the client's (e.g., user's) device. In certain examples, the watermark generation service/system 128 is provided an indication of one or more actions taken in the generation of content (e.g., modified media content) according to (e.g., an opt-in or opt-out from) the one or more privacy settings 150 for a client (e.g., for a client device 146).

In certain examples, the consent marking service/system 126 includes a privacy compliance watermark insertion service/system 128 to insert a privacy compliance watermark 130 into content to generate privacy compliance watermarked content 134 (e.g., a privacy compliance watermarked media file), e.g., where the privacy compliance watermark 130 includes an indication of one or more actions taken in the generation of content (e.g., modified media content) according to (e.g., an opt-in or opt-out from) the one or more privacy settings 150 for a client (e.g., for a client device 146) and/or based on the geographical location of the client's (e.g., user's) device. In certain examples, the watermark insertion service/system 128 is to insert the watermark into an (e.g., metadata of an) image, video, audio file, etc.

As should be understood to one of ordinary skill in the art, a privacy compliance watermark may be utilized in various ways.

In a first example, the privacy settings 150 (or an indication of the privacy settings) for the client (e.g., user) are provided to provider network 100 (e.g., to consent marking service/system 126 thereof). In certain examples, the privacy settings 150 are sent to provider network 100 (e.g., to consent marking service/system 126 thereof) from the client (e.g., user) device 146 as request 138 (e.g., which may include a request for certain (e.g., primary) content (e.g., video/audio)). In certain examples, the client (e.g., user) device 146 (e.g., executing an application) stores the client's (e.g., user's) privacy settings 150. In certain examples, the client (e.g., user) device 146 (e.g., executing an application) requests the privacy settings from the consent management service/system 168, e.g., and then sends those privacy settings (e.g., as request 138) from the device 146 to the provider network 100 (e.g., to consent marking service/system 126 thereof). In certain examples, in response to request 138, the provider network 100 (e.g., consent marking service/system 126 thereof) is to send a response 140 with (or that identifies) the requested content with the corresponding privacy compliance watermark included therewith. In certain examples, the privacy compliance watermark in the response 140 indicates the one or more actions taken in the generation of content (e.g., primary video and/or audio content with secondary content added thereto) according to (e.g., an opt-in or opt-out from) the one or more privacy settings 150 for a client (e.g., for a client device 146). In certain examples, the client (e.g., user) device 146 allows the user to review the applied privacy settings indicated by the privacy compliance watermark in the response 140, e.g., on display 158. In certain examples, the consent management service/system 168 queries the client (e.g., user) device 146 for their privacy settings, and the privacy settings are stored in consent management service/system 168, e.g., for use when later queried by an application executing on client (e.g., user) device 146.

In a second example, the secondary content provider service/system 162 (e.g., external to provider network 100 and/or external to content delivery service/system 102) sends secondary content 164 (e.g., secondary content based on the client's privacy settings 150) with a corresponding privacy compliance watermark included therewith to indicate the one or more actions taken in the generation and/or selection of secondary content 164, e.g., with the privacy compliance watermark included with (i) a request to the secondary content provider service/system 162 and/or (ii) a response from the secondary content provider service/system 162.

In a third example, a (e.g., external from the provider network 100 and/or external to content delivery service/system 102) privacy compliance verification service/system 166 is to use a privacy compliance watermark to check (e.g., audit and/or certify) if (e.g., when) the provided content to a client (e.g., user) complies with the client's (e.g., user's) privacy settings 150, for example, in combination with the location of the device (e.g., where the location dictates which regulations, etc. apply). In certain examples, the privacy compliance verification service/system 166 receives (i) the client's (e.g., user's) privacy settings 150 (shown as a dotted line) and (ii) a privacy compliance watermark for verification 144A, for example, a privacy compliance watermark 144A for one or more files (e.g., secondary content) provided to the client device 146, e.g., content 140 sent with its privacy compliance watermark and/or content sent without its privacy compliance watermark. In certain examples, the privacy compliance verification service/system 166 compares (i) the one or more privacy settings from the indication to (ii) the one or more actions indicated in the privacy compliance watermark to determine a result, e.g., a PASS result indicating when those actions comply with the corresponding privacy settings 150 or a FAIL result. As a non-limiting example, the privacy settings are received that indicate that a client has opted-out of location-based tracking, and the privacy compliance verification service/system 166 compares that privacy setting with a privacy compliance watermark for one or more files (e.g., secondary content) provided to the client device 146, and if the privacy compliance watermark indicates the one or more files (e.g., secondary content) were provided to the client device 146 without the use of the device ID 154 and geolocation was turned off (or reduced precision), the verification result is a PASS, and a FAIL if otherwise. In certain examples, the verification result 144B is sent to the provider network 100 (e.g., consent management service/system 168 and/or consent marking service/system 126) and/or client device 146. In certain examples, privacy compliance verification service/system 166 validates that a watermark is not fraudulent and/or was in fact generated in the expected timeframe.

In certain examples, the privacy settings 150 are device independent, e.g., the privacy settings are checked for a client (e.g., user) even if the device being used to present the content to the client (e.g., user) is not their device, for example, watching a video on a smart TV in a hotel room via a client's (e.g., user's) account. In certain examples, the privacy compliance watermark is an advertising privacy compliance watermark.

In FIG. 1, the consent management service/system 168 (e.g., CMP) is included within provider network 100. In FIG. 2, the consent management service/system 168 (e.g., CMP) is external from the provider network 100 (e.g., is a third-party).

FIG. 2 is a diagram illustrating an environment including a provider network 100, coupled to a client device 146, having a consent marking service/system 126 that utilizes a privacy compliance watermark 130 and a third-party consent management service/system 168 according to some examples.

In comparison to FIG. 1, the consent management service/system 168 in FIG. 2 is external to the provider network 100. In certain examples, the privacy settings 150 for the client (e.g., user) are stored within third-party consent management service/system 168, e.g., instead of being stored solely within client (e.g., user) device 146. In certain examples, the client (e.g., user) device 146 (e.g., an application (e.g., media application) executing on the device) sends request 170 querying the consent management service/system 168 for the corresponding privacy settings, and the consent management service/system 168 sends response 172 to the client (e.g., user) device 146 with the privacy settings 150. In certain examples, the privacy settings 150 are then sent (e.g., as request 138 in FIG. 1) to the provider network 100 (e.g., to consent marking service/system 126).

In certain examples, the consent management service/system 168 queries the client (e.g., user) device 146 for their privacy settings, and the privacy settings are stored in consent management service/system 168, e.g., for use when later queried by the client (e.g., user) device 146, e.g., by an application executing on the client (e.g., user) device 146.

FIG. 3 is a diagram illustrating an example format of a privacy compliance watermark 130 according to some examples. In certain examples, the privacy compliance watermark 130 includes content delivery service/system (e.g., supply side platform) identification value 302, e.g., to identify what content delivery service/system (e.g., supply side platform) generated and/or inserted the privacy compliance watermark 130. In certain examples, the privacy compliance watermark 130 includes an indication 304 (e.g., value) that indicates the applied privacy selection(s) (e.g., the one or more actions taken according to the privacy setting(s)) of a client (e.g., user). In certain examples, the indication 304 (e.g., value) identifies the one or more actions (e.g., applied consent directive(s)) taken according to the opt-in selection(s) and/or the opt-out selection(s) used in generation of the privacy compliance watermark and its associated content. In certain examples, the indication 304 includes one or any combination of: remove device identifiers, reduce geographic-precision (e.g., removing geolocation precision), or remove demographic targeting segments. In certain examples, value 306 identifies the version of the content delivery service/system (e.g., supply side platform), used in generation of the privacy compliance watermark and its associated content, identified in value 302.

Figure 4:
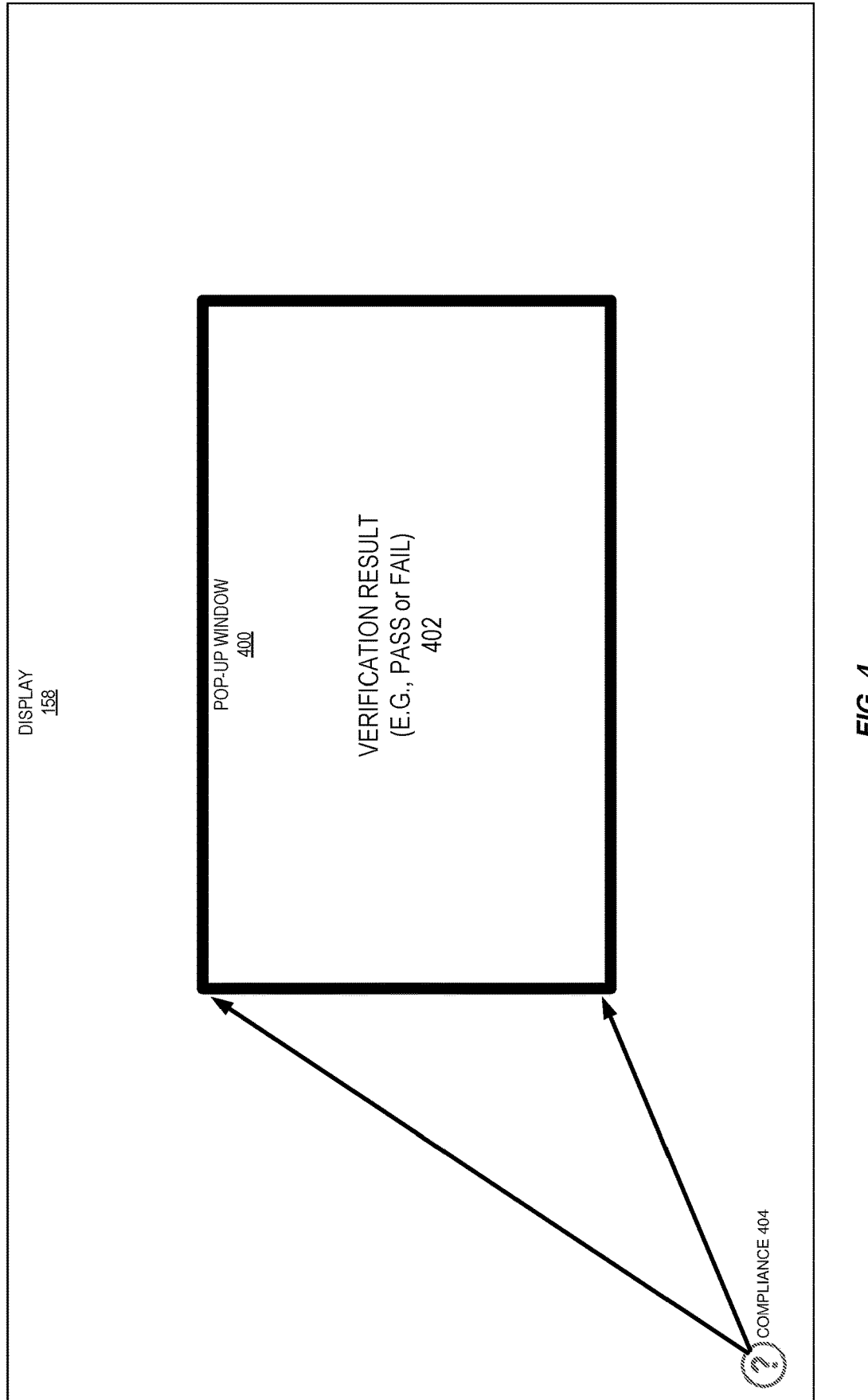
FIG. 4 is a diagram illustrating a graphical user interface (GUI) with a compliance interface element, that when selected, causes a pop-up window to provide a verification result for a privacy compliance check via a privacy compliance watermark according to some examples.

FIG. 4 is a diagram illustrating a graphical user interface (GUI) 400 (shown on display 158) with a compliance interface element 404 (shown as a circle question mark, but other interface elements may be utilized), that when selected (e.g., by a client), causes a pop-up window 400 to provide a verification result 402 (e.g., PASS or FAIL) for a privacy compliance check (e.g., by privacy compliance verification service/system 166 in FIG. 1) via a privacy compliance watermark according to some examples. In certain examples (e.g., instead of a popup), an application (e.g., a browser plugin) renders an icon/image overlay on media assets. In certain examples, a device (e.g., Smart TV device) has a setting to verify and render watermark information (e.g., overlay).

In certain examples, the verification result 402 indicates which of that client's (e.g., user's) settings failed (e.g., the watermark indicated an opt-ed out action was performed) and/or which of that client's (e.g., user's) settings passed (e.g., the watermark indicated an opt-ed in action was performed).

Figure 5:
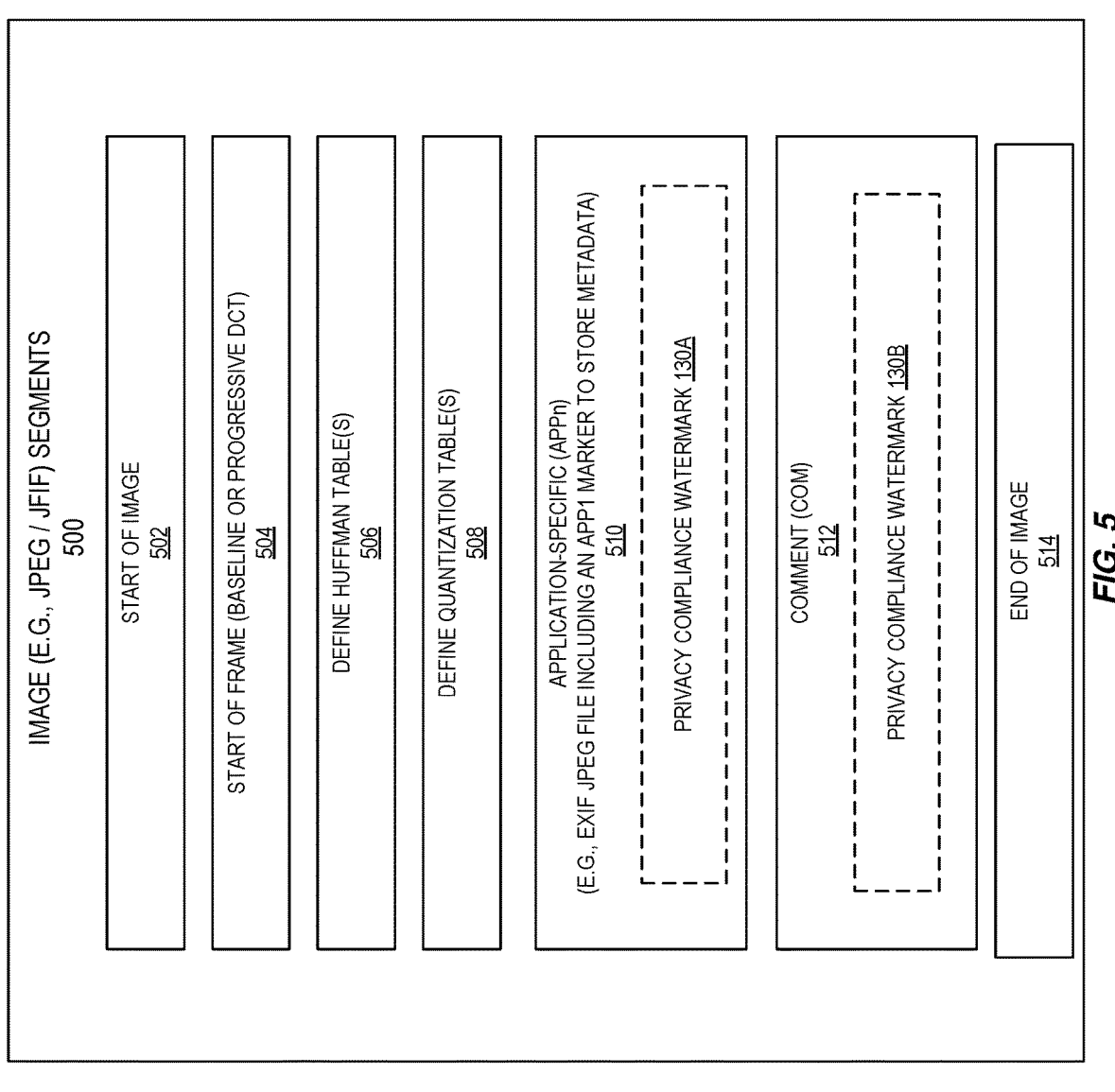
FIG. 5 is a diagram illustrating an example format of segments of an image file that includes a metadata field for a privacy compliance watermark according to some examples.

FIG. 5 is a diagram illustrating an example format of segments 500 of an image file that includes a metadata field (e.g., field 510 and/or field 512) for a privacy compliance watermark according to some examples. In certain examples, the segments 500 (for example, for an image according to a JPEG standard, e.g., a JPEG File Interchange Format (JFIF) standard) of the image file include a start of image 502 segment (with no payload) that identifies a beginning of an image; a start of frame 504 segment (with a payload that specifies the width, height, number of components, and component subsampling), e.g., for a baseline discrete cosine transform (DCT) based image or a progressive DCT based image; a define Huffman table(s) 506 segment (with a payload that defines the Huffman table(s) used); a define quantization table(s) 508 segment (with a payload that defines the quantization table(s) used); an application specific 510 segment (e.g., APPn, where n is any integer 1 or greater) (with a payload that includes a privacy compliance watermark 130A for the image), a comment (COM) 512 segment (with a payload that includes a privacy compliance watermark 130B for the image), an end of image 514 segment (with no payload) that identifies an end of the image that started at 502; or any combination thereof.

In certain examples, the JFIF standard is used for storing and transmitting photographic images on the internet.

Figure 6:
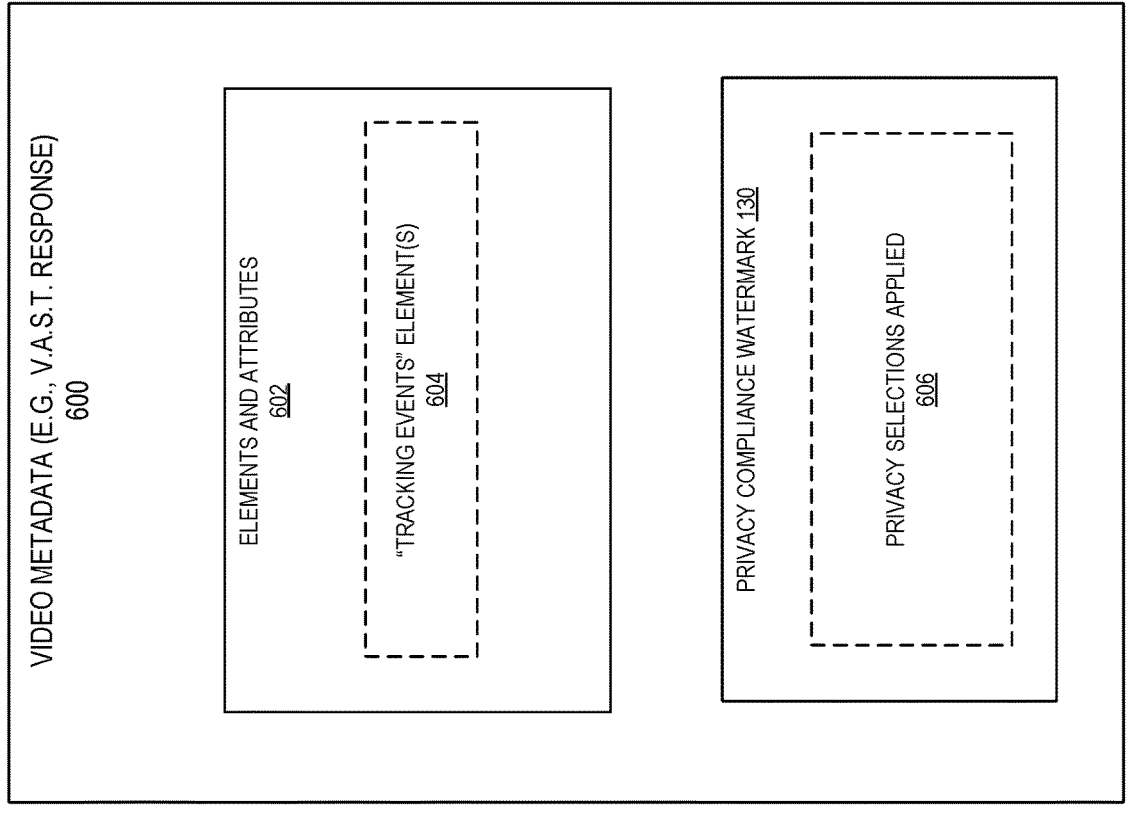
FIG. 6 is a diagram illustrating an example format of video metadata that includes a field for a privacy compliance watermark according to some examples.

FIG. 6 is a diagram illustrating an example format of video metadata 600 (e.g., a VAST response) that includes a field for a privacy compliance watermark 130 according to some examples. In certain examples, metadata 600 includes an elements and attributes 602 field (e.g., including a tracking events element 604); a privacy compliance watermark 130 for the video (e.g., with a field 606 that indicates the privacy selection(s) applied, e.g., the information that indicates which privacy directives, actions, and/or behaviors were applied to the request); or a combination thereof.

FIG. 7 is a flow diagram illustrating operations 700 of a method of generating a privacy compliance watermark that indicates one or more actions taken in the generation of modified content according to one or more privacy settings for a client according to some examples. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 700 are performed by a provider network 100, content delivery service/system 102, secondary content provider service/system 162, and/or privacy compliance verification service/system 166 (e.g., any of these implemented in a provider network) of the other figures.

The operations 700 include, at block 702, receiving an indication of one or more privacy settings for a client. The operations 700 further include, at block 704, inserting secondary content according to the one or more privacy settings (e.g., and in combination with device location) for the client into primary content to generate modified content. The operations 700 further include, at block 706, generating a privacy compliance watermark that indicates one or more actions taken in the generation of the modified content according to the one or more privacy settings for the client. The operations 700 further include, at block 708, transmitting the privacy compliance watermark to the client or to a service. In certain examples, the watermark is inside modified media assets in the content that is transmitted to the client or may be returned together with the media assets, e.g., it is not transmitted independently from the modified media asset. For example, if the watermark is in an image file, in certain examples there is no separate transmission, because the image file is transmitted containing the watermark. In certain examples, the watermark is transmitted independently.

At least some examples of the disclosed technologies can be described in view of the following examples:

Example 1. A computer-implemented method comprising:
receiving a request, by a provider network from a client device, including one or more privacy settings for the client device;
inserting, by the provider network, secondary content according to the one or more privacy settings for the client device into primary content to generate modified content;
generating, by the provider network, a privacy compliance watermark that indicates one or more actions taken by the provider network according to the one or more privacy settings for the client device;
transmitting the privacy compliance watermark from the provider network to the client device or to a service; and
sending the modified content from the provider network to the client device.

Example 2. The computer-implemented method of example 1, wherein the transmitting the privacy compliance watermark is from the provider network to the client device.

Example 3. The computer-implemented method of example 1, wherein the service is a privacy compliance verification service, and the transmitting the privacy compliance watermark is from the provider network to the privacy compliance verification service.

Example 4. A computer-implemented method comprising:

receiving an indication of one or more privacy settings for a client;

inserting secondary content according to the one or more privacy settings for the client into primary content to generate modified content;

generating a privacy compliance watermark that indicates one or more actions taken in the generation of the modified content according to the one or more privacy settings for the client; and transmitting the privacy compliance watermark to the client or to a service.

Example 5. The computer-implemented method of example 4, wherein the transmitting the privacy compliance watermark is to the client.

Example 6. The computer-implemented method of example 4, wherein the service is a privacy compliance verification service, and the transmitting the privacy compliance watermark is to the privacy compliance verification service.

Example 7. The computer-implemented method of example 6, further comprising:

receiving a second indication from the client, by the privacy compliance verification service, of the one or more privacy settings for the client; and comparing the second indication from the client of the one or more privacy settings for the client to the one or more actions indicated in the privacy compliance watermark to determine a result.

Example 8. The computer-implemented method of example 7, further comprising sending an indication of failure to the client in response to the result being a compliance failure.

Example 9. The computer-implemented method of example 8, further comprising blocking a (e.g., any) providing of the modified content to the client in response to the result being the compliance failure.

Example 10. The computer-implemented method of example 7, providing the modified content to the client in response to the result being a compliance success.

Example 11. The computer-implemented method of example 4, wherein the modified content is an image, and the privacy compliance watermark is included in a metadata field of the image.

Example 12. The computer-implemented method of example 4, wherein the modified content is a video, and the privacy compliance watermark is included in a metadata field of the video.

Example 13. The computer-implemented method of example 4, wherein the modified content is audio, and the privacy compliance watermark is included in a metadata field of the audio.

Example 14. The computer-implemented method of example 4, wherein the privacy compliance watermark includes a first field that indicates an entity that performed the inserting, and a second field that indicates the one or more privacy settings applied by the entity for the client.

Example 15. The computer-implemented method of example 4, wherein the inserting the secondary content is according to a regulation based on a location of the client and according to the one or more privacy settings for the client.

Example 16. A non-transitory computer-readable medium storing code that, when executed by a device, causes the device to perform a method comprising:

receiving an indication of one or more privacy settings for a client;

inserting secondary content according to the one or more privacy settings for the client into primary content to generate modified content;

generating a privacy compliance watermark that indicates one or more actions taken in the generation of the modified content according to the one or more privacy settings for the client; and transmitting the privacy compliance watermark to the client or to a service.

Example 17. The non-transitory computer-readable medium of example 16, wherein the transmitting the privacy compliance watermark is to the client.

Example 18. The non-transitory computer-readable medium of example 16, wherein the service is a privacy compliance verification service, and the transmitting the privacy compliance watermark is to the privacy compliance verification service.

Example 19. The non-transitory computer-readable medium of example 18, wherein the method further comprises:

receiving a second indication from the client, by the privacy compliance verification service, of the one or more privacy settings for the client; and comparing the second indication from the client of the one or more privacy settings for the client to the one or more actions indicated in the privacy compliance watermark to determine a result.

Example 20. The non-transitory computer-readable medium of example 19, wherein the method further comprises blocking a (e.g., any) providing of the modified content to the client in response to the result being a compliance failure.

Example 21. The non-transitory computer-readable medium of example 20, wherein the method further comprises providing the modified content to the client in response to the result being a compliance success.

Exemplary environments, systems, etc. that the above may be used in are detailed below.

Figure 8:
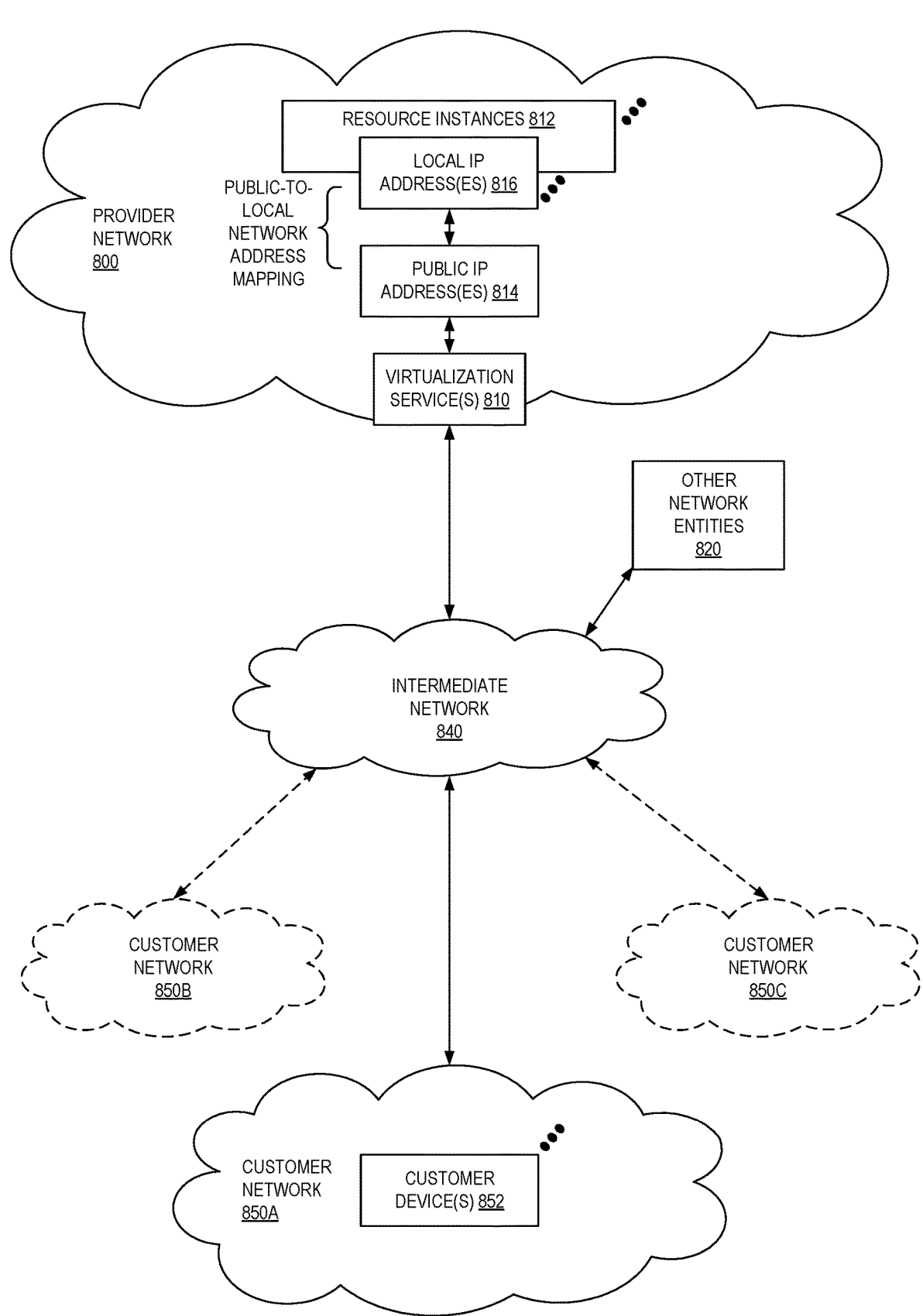
FIG. 8 illustrates an example provider network environment according to some examples.

FIG. 8 illustrates an example provider network (or "service provider system") environment according to some examples. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some examples, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
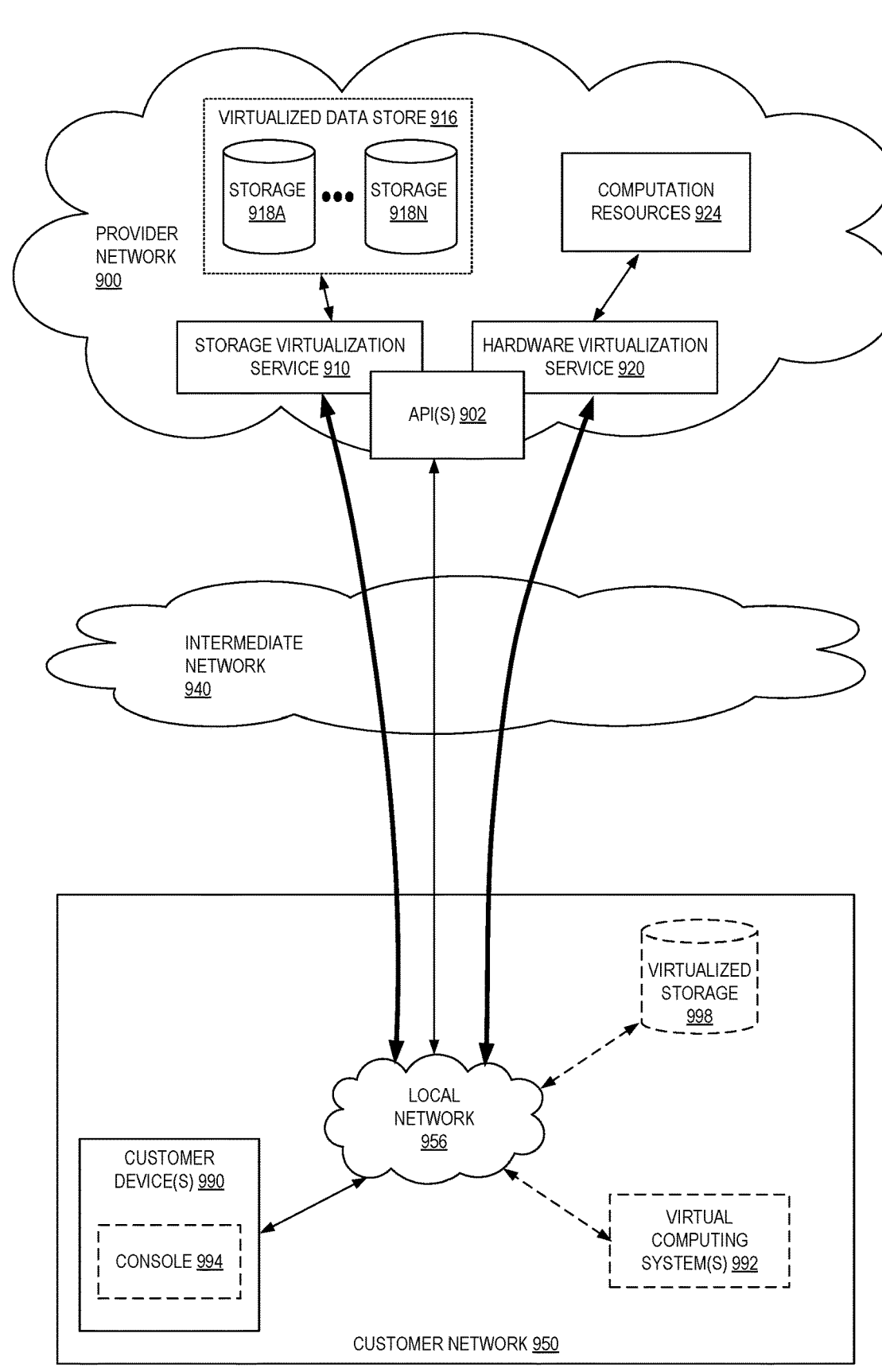
FIG. 9 is a block diagram of an example provider network that provides a storage service and a hardware virtualization service to customers according to some examples.

FIG. 9 is a block diagram of an example provider network that provides a storage service and a hardware virtualization service to customers, according to some examples. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some examples, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some examples, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some examples, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some examples, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
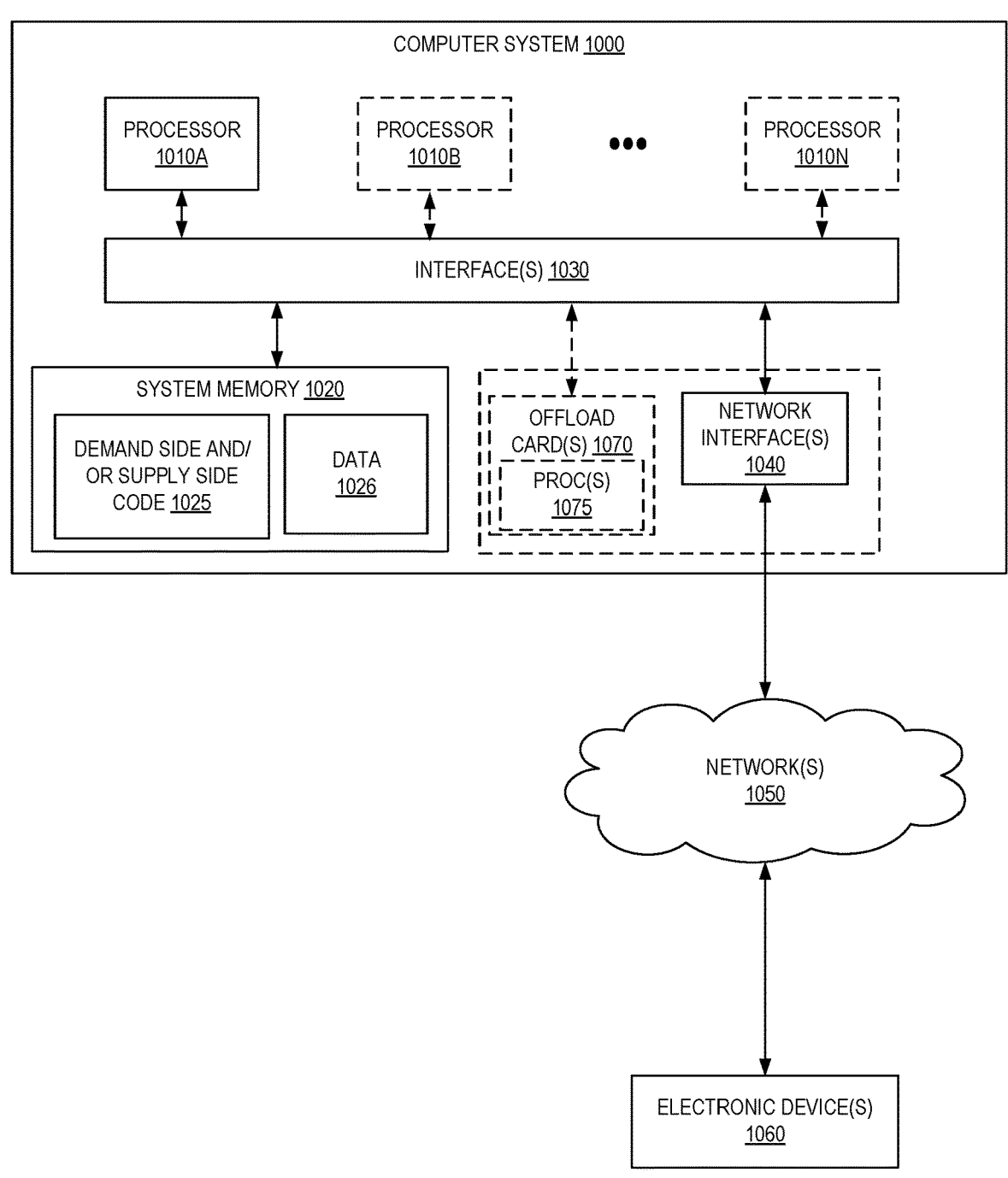
FIG. 10 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1000 illustrated in FIG. 10. In the illustrated example, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various examples a computer system 1000 may include one computing device or any number of computing devices configured to work together as a single computer system 1000.

In various examples, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various examples, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various examples, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1020 as demand side and/or supply side code 1025 (e.g., executable to implement, in whole or in part, the operations discussed herein) and data 1026.

In one example, I/O interface 1030 may be configured to coordinate I/O traffic between processor 1010, system memory 1020, and any peripheral devices in the device, including network interface 1040 or other peripheral interfaces. In some examples, I/O interface 1030 may perform any necessary protocol, timing or other data transformations to convert data signals from one component (e.g., system memory 1020) into a format suitable for use by another component (e.g., processor 1010). In some examples, I/O interface 1030 may include support for devices attached through various types of peripheral buses, such as a variant of the Peripheral Component Interconnect (PCI) bus standard or the Universal Serial Bus (USB) standard, for example. In some examples, the function of I/O interface 1030 may be split into two or more separate components, such as a north bridge and a south bridge, for example. Also, in some examples some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various examples, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some examples the offload card(s) 1070 can perform compute instance management operations such as pausing and/or un-pausing compute instances, launching and/or terminating compute instances, performing memory transfer/copying operations, etc. These management operations may, in some examples, be performed by the offload card(s) 1070 in coordination with a hypervisor (e.g., upon a request from a hypervisor) that is executed by the other processors 1010A-1010N of the computer system 1000. However, in some examples the virtualization manager implemented by the offload card(s) 1070 can accommodate requests from other entities (e.g., from compute instances themselves), and may not coordinate with (or service) any separate hypervisor.

In some examples, system memory 1020 may be one example of a computer-accessible medium configured to store program instructions and data as described above. However, in other examples, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some examples of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
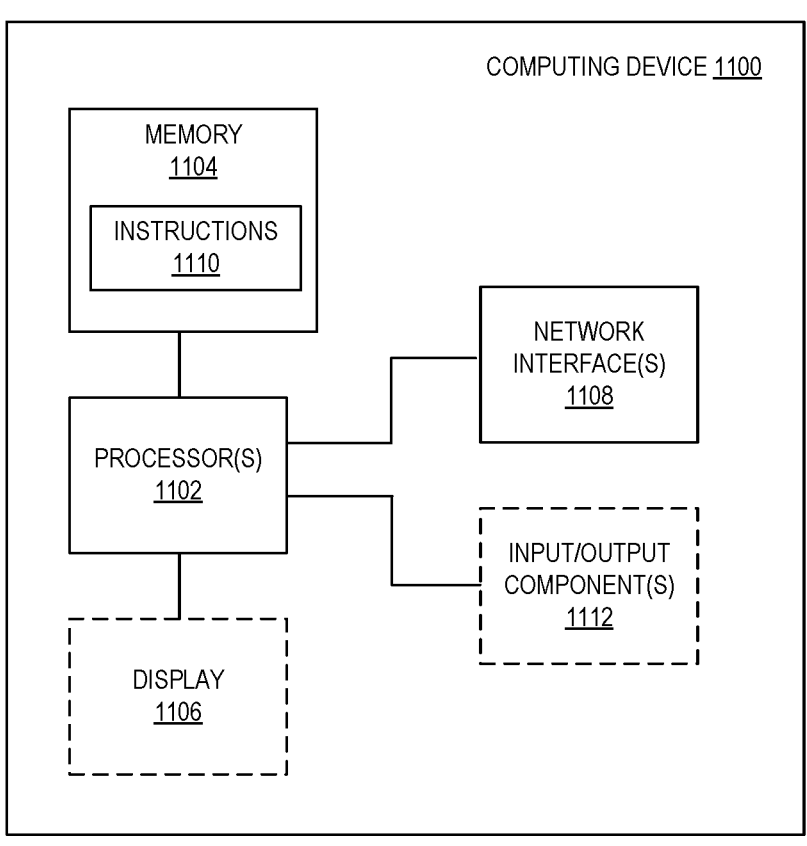
FIG. 11 illustrates a logical arrangement of a set of general components of an exemplary computing device that can be utilized in accordance with various examples.

FIG. 11 illustrates a logical arrangement of a set of general components of an example computing device 1100. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (for example, instructions 1110, e.g., which implement a content delivery service as disclosed herein), and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1110) for execution on the set of one or more processors 1102 of that electronic device. One or more parts of various examples may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some examples include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 12:
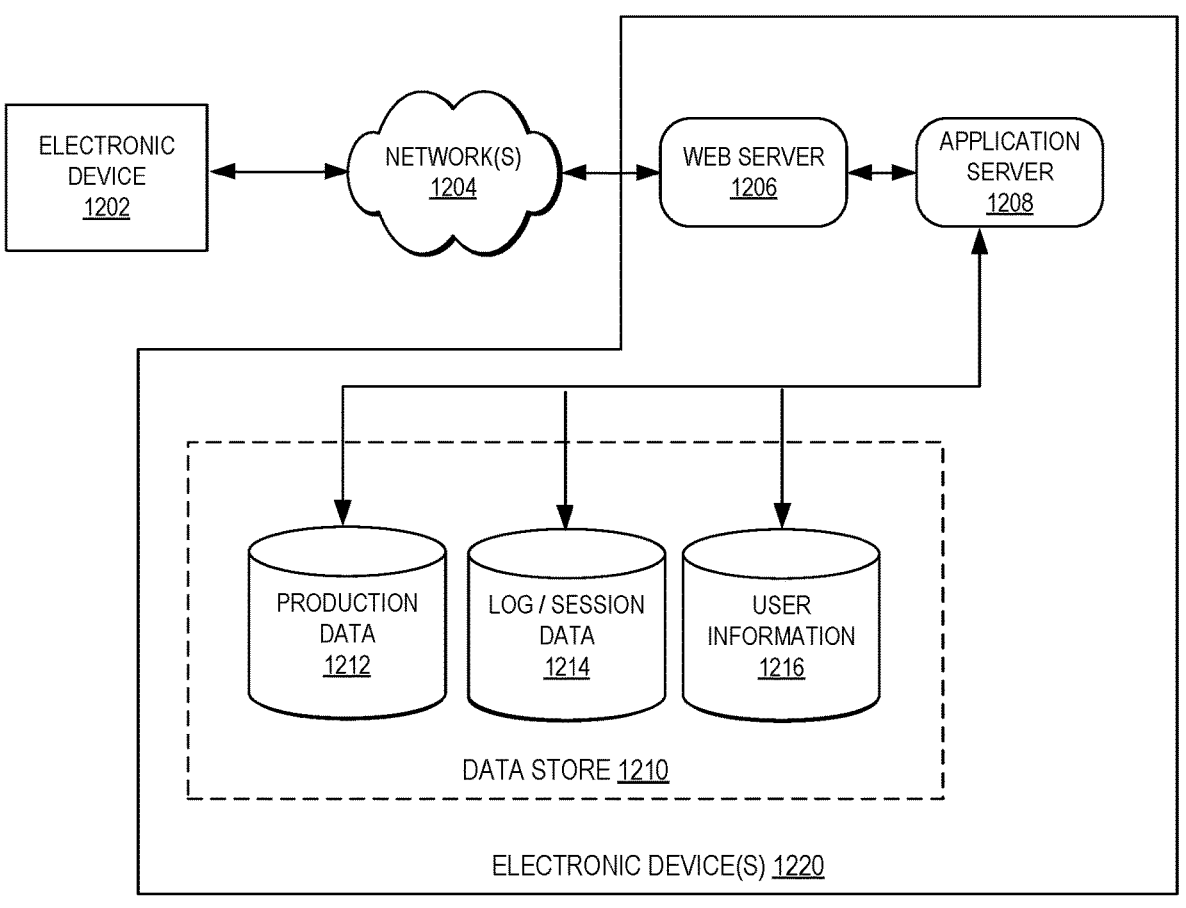
FIG. 12 illustrates an example of an environment for implementing aspects in accordance with various examples.

As discussed, different approaches can be implemented in various environments in accordance with the described examples. For example, FIG. 12 illustrates an example of an environment 1200 for implementing aspects in accordance with various examples. For example, in some examples messages are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various examples. The system includes an electronic client device 1202, which may also be referred to as a client device and can be any appropriate device operable to send and receive requests, messages or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 918A-918N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving a request, by a provider network from a client device, including one or more privacy settings for the client device;

inserting, by the provider network, secondary content according to the one or more privacy settings for the client device into primary content to generate modified content;

generating, by the provider network, a privacy compliance watermark that indicates one or more actions taken by the provider network according to the one or more privacy settings for the client device;

transmitting the privacy compliance watermark from the provider network to the client device or to a service; and sending the modified content from the provider network to the client device.

2. The computer-implemented method of claim 1, wherein the transmitting the privacy compliance watermark is from the provider network to the client device.

3. The computer-implemented method of claim 1, wherein the service is a privacy compliance verification service, and the transmitting the privacy compliance watermark is from the provider network to the privacy compliance verification service.

4. A computer-implemented method comprising:

receiving an indication of one or more privacy settings for a client;

inserting secondary content according to the one or more privacy settings for the client into primary content to generate modified content;

generating a privacy compliance watermark that indicates one or more actions taken in the generation of the modified content according to the one or more privacy settings for the client; and transmitting the privacy compliance watermark to the client or to a service.

5. The computer-implemented method of claim 4, wherein the transmitting the privacy compliance watermark is to the client.

6. The computer-implemented method of claim 4, wherein the service is a privacy compliance verification service, and the transmitting the privacy compliance watermark is to the privacy compliance verification service.

7. The computer-implemented method of claim 6, further comprising:

receiving a second indication from the client, by the privacy compliance verification service, of the one or more privacy settings for the client; and comparing the second indication from the client of the one or more privacy settings for the client to the one or more actions indicated in the privacy compliance watermark to determine a result.

8. The computer-implemented method of claim 7, further comprising sending an indication of failure to the client in response to the result being a compliance failure.

9. The computer-implemented method of claim 8, further comprising blocking a providing of the modified content to the client in response to the result being the compliance failure.

10. The computer-implemented method of claim 7, providing the modified content to the client in response to the result being a compliance success.

11. The computer-implemented method of claim 4, wherein the inserting the secondary content is according to a regulation based on a location of the client and according to the one or more privacy settings for the client.

12. The computer-implemented method of claim 4, wherein the modified content is a video, and the privacy compliance watermark is included in a metadata field of the video.

13. The computer-implemented method of claim 4, wherein the modified content is audio, and the privacy compliance watermark is included in a metadata field of the audio.

14. The computer-implemented method of claim 4, wherein the privacy compliance watermark includes a first field that indicates an entity that performed the inserting, and a second field that indicates the one or more privacy settings applied by the entity for the client.

15. A non-transitory computer-readable medium storing code that, when executed by a device, causes the device to perform a method comprising:

receiving an indication of one or more privacy settings for a client;

inserting secondary content according to the one or more privacy settings for the client into primary content to generate modified content;

generating a privacy compliance watermark that indicates one or more actions taken in the generation of the modified content according to the one or more privacy settings for the client; and transmitting the privacy compliance watermark to the client or to a service.

16. The non-transitory computer-readable medium of claim 15, wherein the transmitting the privacy compliance watermark is to the client.

17. The non-transitory computer-readable medium of claim 15, wherein the service is a privacy compliance verification service, and the transmitting the privacy compliance watermark is to the privacy compliance verification service.

18. The non-transitory computer-readable medium of claim 17, wherein the method further comprises:

receiving a second indication from the client, by the privacy compliance verification service, of the one or more privacy settings for the client; and comparing the second indication from the client of the one or more privacy settings for the client to the one or more actions indicated in the privacy compliance watermark to determine a result.

19. The non-transitory computer-readable medium of claim 18, wherein the method further comprises blocking a providing of the modified content to the client in response to the result being a compliance failure.

20. The non-transitory computer-readable medium of claim 18, wherein the method further comprises providing the modified content to the client in response to the result being a compliance success.

* * * * *